United States Patent [19]

Steck, III

[11] 3,967,876

[45] July 6, 1976

[54] TELESCOPIC GUN SIGHT

[75] Inventor: William F. Steck, III, Stamford, Conn.

[73] Assignee: W. R. Weaver Company, El Paso, Tex.

[22] Filed: June 26, 1974

[21] Appl. No.: 483,168

Related U.S. Application Data

[63] Continuation-in-part of Ser. No. 381,312, July 20, 1973, abandoned.

[52] U.S. Cl. .................................... 350/54; 350/40
[51] Int. Cl.² .......................................... G02B 23/00
[58] Field of Search ....................... 350/10, 40–44, 350/45, 54

[56] References Cited

UNITED STATES PATENTS

| | | | |
|---|---|---|---|
| 1,395,822 | 11/1921 | Hastings | 350/54 |
| 1,464,655 | 8/1923 | Jacob | 350/42 |
| 2,207,124 | 7/1940 | Kollmorgen | 350/54 X |
| 2,479,792 | 8/1949 | Tackaberry | 350/42 |
| 3,045,545 | 7/1962 | Korones et al. | 350/41 |
| 3,172,941 | 3/1965 | Norman | 350/42 |

OTHER PUBLICATIONS

Henson, *Binoculars, Telescopes and Telescopic Sights* Textbook published in 1955, pp. 60–63, 88–95, 314–316 and 347–351.

*Primary Examiner*—David H. Rubin
*Attorney, Agent, or Firm*—Donald R. Motsko; William W. Jones

[57] ABSTRACT

A telescopic sight for use on a firearm, which sight provides an eye relief of greater than about 3.0 inches and an exit pupil of greater than about 25 mm. so that the target as viewed through the scope will substantially fill the eyepiece. The scope reduces the necessity of close alignment of the viewer's eye with the optical axis of the scope, thus enabling the viewer to quickly pick up the target with the scope and fire.

4 Claims, 1 Drawing Figure

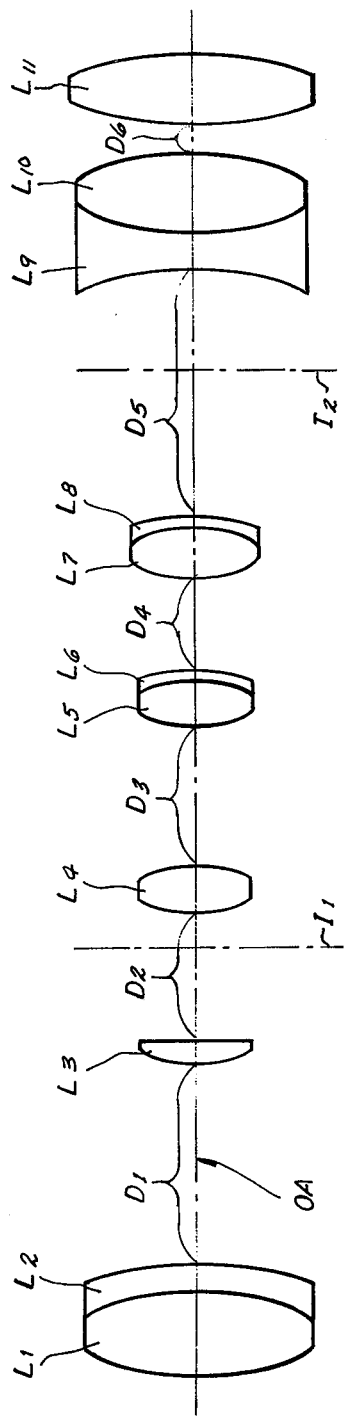

TELESCOPIC GUN SIGHT

This application is a continuation-in-part of my copending application Ser. No. 381,312, filed July 20, 1973 now abandoned.

This invention relates to telescopic gun sights or other similar optical sighting devices, and more particularly to an optical sighting device with increased latitude vis-a-vis all dimensions of the exit pupil as compared to the prior art devices of this type.

Optical sighting devices are, of course, regularly used in conjunction with firearms, and other devices for the purpose of aiming the firearm, or the like. The sighting device, or scope, is mounted on and prealigned with the firearm so that a target viewed through the scope will be hit by a projectile fired from the firearm.

When aiming at a moving target or at a target that is apt to vanish behind underbrush at any moment, the most critical problem is to be able to aim quickly. Until this invention, manufacturers believed they solved this problem by providing a scope with a larger field of view. This helps because it is obviously true that it is easier to find a target when the scope takes in a large area rather than a small area. However, I have discovered that two other factors are as important, or more so, for fast aiming, than a large field of view.

The first of these is eye relief. The eye relief of a scope is the distance at which the viewer's eye must be spaced from the scope ocular in order to properly view a target image through the scope.

I have found that when the eye relief of a scope is relatively short, for example about 1 inch, the fore and aft latitude from the 1 inch position is quite small, so that the eye must be very close to the actual 1 inch distance to see the target. On the other hand, when the eye relief of a scope is relatively long, for example 3 inches or greater, the fore and aft latitude is greater and the eye need not be so precisely placed. This reduces the time required for eye placement.

The second of these is exit pupil. The exit pupil of a scope is the diameter of the image viewed through the scope, and can be defined as the diameter of the objective lens divided by the power of the scope. It is thus readily apparent that the exit pupil for a fixed power scope will be fixed, while the exit pupil for a variable power scope will vary depending on the power setting of the scope. Much discussion has been generated in the past about what size exit pupil is necessary for a scope. since the diameter of the normal eye pupil is about 5 mm., it has been argued that an exit pupil greater than 5 mm. is unnecessary because the eye cannot receive a bundle of light rays larger than its pupil diameter. These considerations have, however, been mainly concerned with the brightness of the image viewed, and not with the quickness with which a target can be sighted. It will be readily appreciated that considerable difficulty will be encountered by a viewer trying to quickly line up two circles which are only 5 mm. in diameter, one being the exit pupil of the scope and the other being the diameter of the pupil of the viewer's eye. The difficulty is increased when the eye relief of the scope is large, as is preferred with a quick sighting scope.

In order to greatly increase the speed with which a target can be sighted, I propose a scope with an exit pupil large enough to substantially fill the ocular with the target image, for example an exit pupil of 25 mm. or greater, and an eye relief which is long enough to greatly reduce the criticality of the spacing of the eye from the ocular, for example, an eye relief of 3 inches or more. With this combination of increased exit pupil and eye relief I have discovered that a target can be very quickly located in the scope for quick aiming and firing.

The two most important requirements for obtaining a quick sighting scope are the diameter of the exit pupil and the filling of the ocular lens with exit pupil. As previously noted the diameter of the objective lens divided by the power of the scope equals the diameter of the exit pupil. A truly quick aiming scope must have an exit pupil diameter of about 25 mm or more. Thus the diameter of the objective lens must be selected so that the exit pupil diameter will be about 25 mm or more at the lowest possible power setting for the scope. The lowest possible power setting will be the stated power for a fixed power scope, and the lowest power setting for a variable power scope. Once the objective lens diameter is chosen and the lowest power setting of the scope is determined, the diameter of the ocular lens is selected so as not to exceed the diameter of the determined exit pupil. The resulting scope will have an exit pupil which is greater than about 25 mm in diameter and which substantially fills the ocular lens. Since the diameter of the ocular lens will control the size of the field of view, and since the size of the field of view is also important with respect to quick sighting, the diameter of the ocular lens should preferably be as close to the diameter of the exit pupil as possible. This will provide the maximum possible field of view along with the large exit pupil which substantially fills the ocular lens. By way of example, a one power scope, either fixed or variable having a minimum power setting of 1 ×, can be provided with an objective lens having a diameter of 25 mm or greater, and an ocular lens having a diameter equal to the diameter of the objective lens. These requirements would result in the ultimate in a quick sighting one power scope.

If the exit pupil is large enough to fill the ocular lens, then the eye relief can be established at a given minimum distance, preferably about 3 inches, and there will be no practical maximum eye relief. The absence of a maximum limit to the eye relief of filling the ocular with exit pupil, and provides for wide latitude with respect to eye placement as measured longitudinally from the ocular lens.

It is, therefore, an object of this invention to provide a telescopic gunsight having increased exit pupil size and eye relief for quickly locating a target therein.

It is another object of this invention to provide a telescopic gunsight of the character described wherein the exit pupil size will substantially fill the ocular lens with target image.

It is yet another object of this invention to provide a telescopic gunsight of the character described wherein the exit pupil diameter is at least 25 mm and the eye relief is at least 3 inches.

These and other objects and advantages of the telescopic gunsight of this invention will become more readily apparent from the following detailed description of a preferred embodiment thereof taken in conjunction with the accompanying drawing, which is a diagrammatic representation of the arrangement and positioning of telescopic gunsight lenses in a preferred embodiment of a telescopic gunsight made in accordance with this invention.

Referring now to the drawing, there is depicted a schematic representation of an arrangement of lenses for a variable power telescopic gunsight which is designed to provide a lowest magnification of 1.094 power. The lenses include an objective lens doublet $L_1$ and $L_2$; an objective lens focal length modifying lens $L_3$; a collector lens $L_4$; a front erector lens doublet $L_5$ and $L_6$; a rear erector lens doublet $L_7$ and $L_8$; and an ocular lens set comprising a field lens doublet $L_9$ and $L_{10}$, and an eye lens $L_{11}$. The first image plane $I_1$ is shown as a phantom line as is the second image plane $I_2$. The reticle is preferably positioned in the second image plane. The optical axis OA of the scope is also shown as a phantom line.

The following table, Table I, provides pertinent data regarding the various lenses shown.

TABLE I

| Lens set Name | Lens No. | Th. | Dia. | $RC_F$ | $RC_R$ | Ind. Ref. | F.L. | Comb.F.L. |
|---|---|---|---|---|---|---|---|---|
| OBJECTIVE | $L_1$ | .282" | 1.310" | +3.037" | −1.778" | 1.517 | 2.169" | 4.322" |
|  | $L_2$ | .085" | 1.310" | −1.778" | −4.745" | 1.653 | −4.354" |  |
| OBJ.F.L.MOD. | $L_3$ | .172" | .818" | +1.037" | ∞ | 1.517 | 2.006" |  |
| COLLECTOR | $L_4$ | .196" | .720" | +1.216" | −.843" | 1.517 | 1.027" |  |
| FRONT ERECTOR | $L_5$ | .160" | .515" | +1.230" | −.583" | 1.617 | .641" | 1.432" |
|  | $L_6$ | .062" | .515" | −.583" | −1.760" | 1.751 | −1.161" |  |
| REAR ERECTOR | $L_7$ | .160" | .515" | +1.230" | −.583" | 1.617 | .641" | 1.432" |
|  | $L_8$ | .062" | .515" | −.583" | −1.760" | 1.751 | −1.161" |  |
| OCULAR | $L_9$ | .085" | 1.245" | −2.349" | +1.665" | 1.700 | −1.392" | 1.920" |
|  | $L_{10}$ | .392" | 1.245" | +1.665" | −1.207" | 1.523 | 1.338" |  |
|  | $L_{11}$ | .299" | 1.265" | +2.534" | −2.534" | 1.523 | 2.422" |  |

In Table I, Th. is the thickness of the lens as measured at the optical axis OA of the scope; Dia. is the diameter of the lens; $RC_F$ is the front radius of curvature of the lens, i.e. the radius of curvature of the left handmost surface of the lens as viewed in the drawing; $RC_R$ is the rear radius of curvature of the lens, i.e. the radius of curvature of the right handmost surface of the lens as viewed in the drawing; Ind. Ref. is the index of refraction of the lens; F.L. is the focal length of the lens; and Comb. F.L. is the combined focal length of the separate lens sets. All measurements are set forth in inches, as indicated. It will be understood that the radius of curvature of the lens surfaces are indicated as being positive if the center of the radius of curvature is to the right of the lens as viewed in the drawing, and negative if the center of the radius of curvature is to the left of the lens as viewed in the drawing.

The distances between adjacent lenses or lens sets at the lowest power setting of the scope, 1.094×, as measured in inches along the optical axis are as follows: $D_1$ = 2.013 inches; $D_2$ = 1.363 inches; $D_3$ = 1.110 inches; $D_4$ = 0.498 inches; $D_5$ = 2.413 inches; and $D_6$ = 0.048 inches.

As can be readily determined, the exit pupil of the illustrated scope embodiment at its lowest power setting will be approximately 30 mm. The diameter of the ocular lens is also approximately 30 mm so that the exit pupil will substantially fill the ocular lens. The diameter of the ocular lens is very nearly as large as the diameter of the objective lens so as to provide a large field of view while maintaining the condition that the exit pupil substantially fill the ocular lens. The eye relief of the specific embodiment disclosed is 3¼ inches. Since the exit pupil substantially fills the ocular lens, the eye may be positioned anywhere from about 3 inches to about 12 inches from the eye lens to view the target clearly.

While I have disclosed one specific embodiment of a scope formed in accordance with my invention, those skilled in the art will readily recognize that there are many ways of providing a scope having an exit pupil of 25 mm. or greater diameter which substantially fills the ocular lens at lowest power setting simply by varying the objective and ocular lens diameters, and the lowest possible power setting for the scope.

Since many changes and variations of the disclosed embodiment of the invention may be made without departing from the inventive concept, it is not intended to limit the invention otherwise than as required by the appended claims.

What is claimed is:

1. An optical gun sight comprising a plurality of lenses including objective lens means, ocular lens means, and erector lens means interposed between said objective and ocular lens means, said objective lens means having a diameter which, at a lowest magnification power of the sight, is operative to provide an exit pupil of at least about 25 mm in diameter, and said ocular lens means having a diameter which is substantially no greater than the diameter of said exit pupil at the lowest magnification power of the sight so that said ocular lens means is substantially filled with exit pupil at the lowest magnification power of the sight.

2. The optical gun sight of claim 1, wherein said lens means are operable to provide said sight with a minimum eye relief of about 3 inches and substantially no maximum eye relief.

3. The optical gun sight of claim 1, wherein said ocular lens means has a diameter which is approximately equal to the diameter of said exit pupil at the lowest magnification power of the sight.

4. The optical gun sight of claim 1, wherein said lowest magnification power of the sight is approximately 1 power, and the respective diameters of said objective and ocular lens means are approximately equal.

\* \* \* \* \*

UNITED STATES PATENT OFFICE
CERTIFICATE OF CORRECTION

Patent No. 3,967,876             Dated July 6, 1976

Inventor(s) William F. Steck, III

It is certified that error appears in the above-identified patent and that said Letters Patent are hereby corrected as shown below:

Col. 2, line 45, after the word "relief" please insert --is a result--.

Signed and Sealed this

Thirtieth Day of November 1976

[SEAL]

Attest:

RUTH C. MASON
Attesting Officer

C. MARSHALL DANN
Commissioner of Patents and Trademarks